(12) United States Patent
Gulati et al.

(10) Patent No.: US 11,451,327 B2
(45) Date of Patent: Sep. 20, 2022

(54) FRAME BASED LISTEN BEFORE TALK FOR RADAR ENABLED DEVICES WITH VARIABLE CHIRP LENGTHS

(71) Applicant: QUALCOMM Incorporated, San Diego, CA (US)

(72) Inventors: Kapil Gulati, Belle Mead, NJ (US); Dan Zhang, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 16/949,462

(22) Filed: Oct. 29, 2020

(65) Prior Publication Data

US 2022/0140941 A1 May 5, 2022

(51) Int. Cl.
*H04L 1/00* (2006.01)

(52) U.S. Cl.
CPC ................................. *H04L 1/0028* (2013.01)

(58) Field of Classification Search
CPC .................................................... H04L 1/0028
See application file for complete search history.

(56) References Cited

U.S. PATENT DOCUMENTS

| | | |
|---|---|---|
| 2006/0223448 A1 | 10/2006 | Kruys |
| 2019/0383925 A1* | 12/2019 | Gulati ............... G01S 7/023 |
| 2019/0391247 A1* | 12/2019 | Gulati ............ G01S 13/343 |
| 2020/0025866 A1* | 1/2020 | Gulati ............ G01S 7/0235 |
| 2020/0033442 A1* | 1/2020 | Gulati ............ G01S 7/0234 |

OTHER PUBLICATIONS

International Search Report and Written Opinion—PCT/US2021/071520—ISA/EPO—dated Mar. 28, 2022.
Partial International Search Report—PCT/US2021/071520—ISA/EPO—dated Feb. 3, 2022.

* cited by examiner

*Primary Examiner* — Jae Y Lee
(74) *Attorney, Agent, or Firm* — Harrity & Harrity LLP/Qualcomm Incorporated

(57) ABSTRACT

Various aspects of the present disclosure generally relate to wireless communication. In some aspects, a radar enabled device may perform a plurality of listen before talk (LBT) procedures corresponding to a plurality of chirp lengths. The radar enabled device may transmit a particular signal (e.g., a radar signal) based at least in part on a successful result of an LBT procedure of the plurality of LBT procedures. Numerous other aspects are provided.

30 Claims, 9 Drawing Sheets

FRAME BASED LISTEN BEFORE TALK FOR RADAR ENABLED DEVICES WITH VARIABLE CHIRP LENGTHS

FIELD OF THE DISCLOSURE

Aspects of the present disclosure generally relate to wireless communication and to techniques and apparatuses for frame based listen before talk for radar enabled devices with variable chirp lengths.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a radar enabled device includes performing a plurality of listen before talk (LBT) procedures corresponding to a plurality of chirp lengths; and transmitting a radar signal based at least in part on a successful result of an LBT procedure of the plurality of LBT procedures.

In some aspects, a radar enabled device for wireless communication includes a memory and one or more processors operatively coupled to the memory, the memory and the one or more processors configured to: perform a plurality of LBT procedures corresponding to a plurality of chirp lengths; and transmit a radar signal based at least in part on a successful result of an LBT procedure of the plurality of LBT procedures.

In some aspects, a non-transitory computer-readable medium storing a set of instructions for wireless communication includes one or more instructions that, when executed by one or more processors of a radar enabled device, cause the radar enabled device to: perform a plurality of LBT procedures corresponding to a plurality of chirp lengths; and transmit a radar signal based at least in part on a successful result of an LBT procedure of the plurality of LBT procedures.

In some aspects, an apparatus for wireless communication includes means for performing a plurality of LBT procedures corresponding to a plurality of chirp lengths; and means for transmitting a particular signal based at least in part on a successful result of an LBT procedure of the plurality of LBT procedures. For example, in some implementations, such a particular signal may comprise a radar signal.

Aspects generally include a method, apparatus, system, computer program product, non-transitory computer-readable medium, user equipment, base station, wireless communication device, radar enabled device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technologies (RAT), aspects of the present disclosure can be applied to other RATs, such as a 3G RAT, a 4G RAT, and/or a RAT subsequent to 5G (e.g., 6G).

Figure 1:
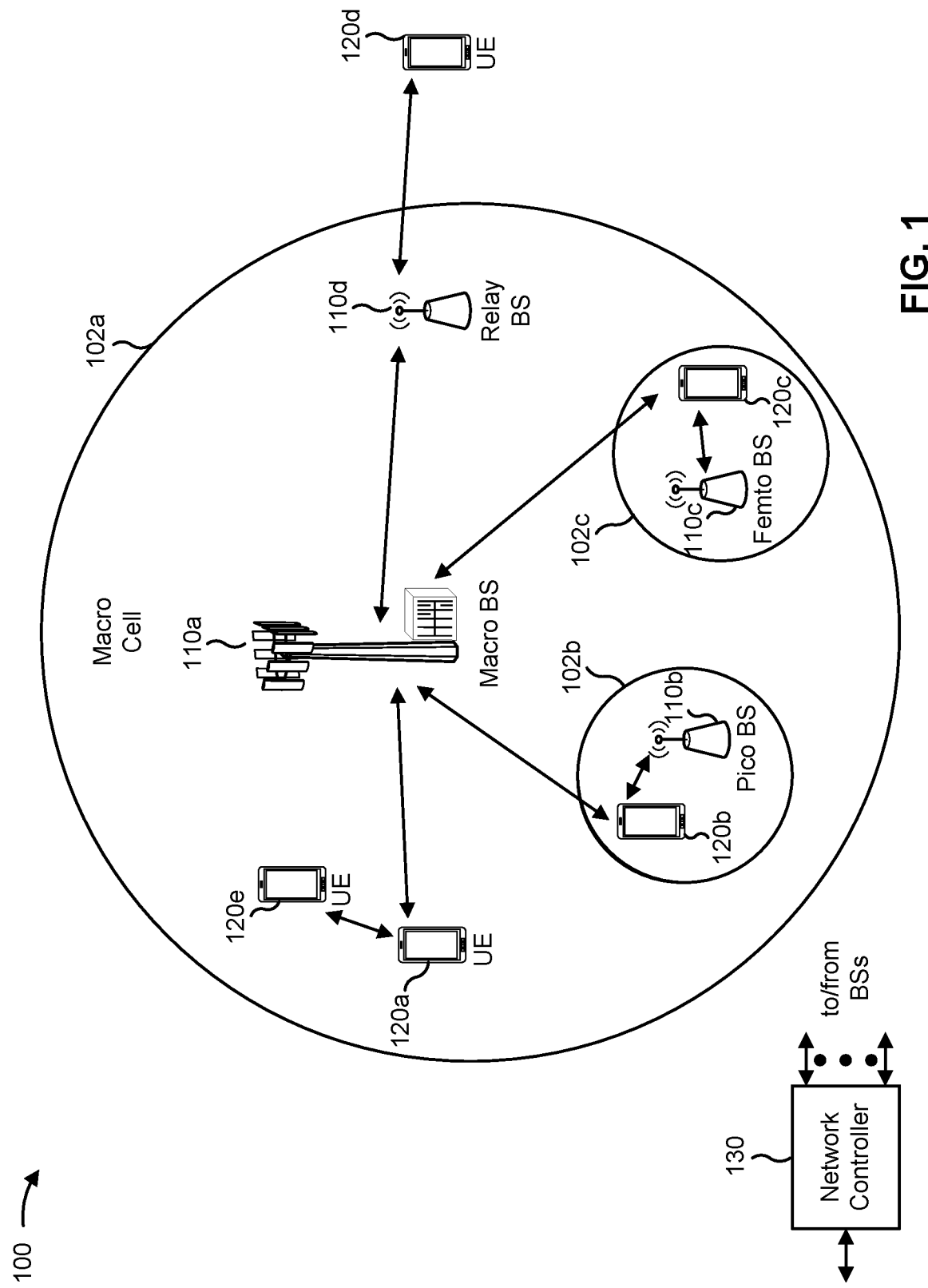
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be, include, or be included in a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, a radar enabled device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
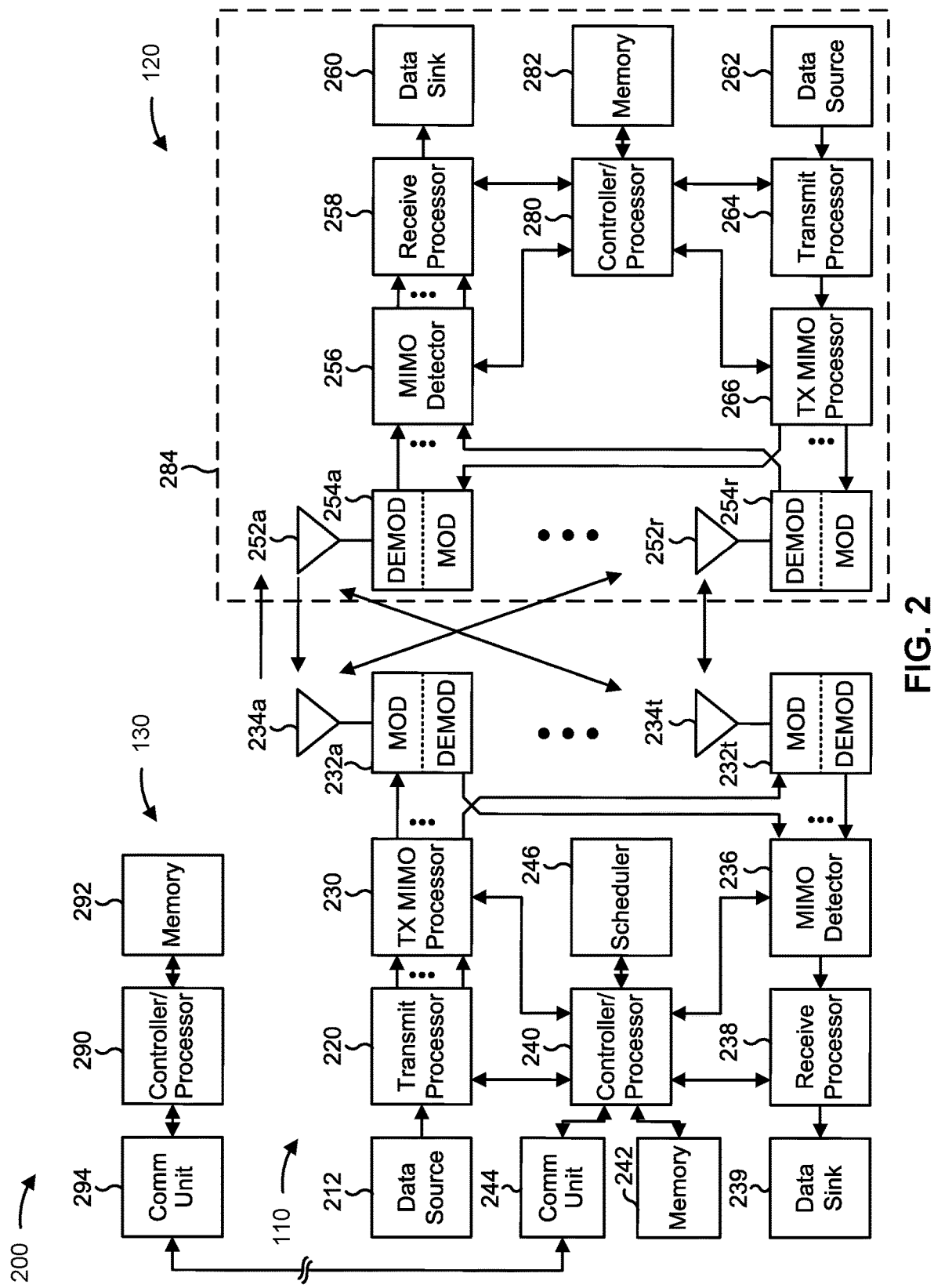
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-7.

Controller/processor 240 of base station 110, controller/processor 280 of UE 120, and/or any other component(s) of FIG. 2 may perform one or more techniques associated with frame based listen before talk (LBT) for radar enabled devices with variable chirp length, as described in more detail elsewhere herein. For example, controller/processor 240 of base station 110, controller/processor 280 of UE 120, and/or any other component(s) of FIG. 2 may perform or direct operations of, for example, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 700 of FIG. 7, and/or other processes as described herein. In some aspects, executing instructions may include running the instructions, converting the instructions, compiling the instructions, interpreting the instructions, and/or the like.

In some aspects, a radar enabled device (which may be, include, or be included in a base station 110, a UE 120, and/or the like) may include means for performing a plurality of LBT procedures corresponding to a plurality of chirp lengths, means for transmitting a particular signal (e.g., a radar signal) based at least in part on a successful result of an LBT procedure of the plurality of LBT, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
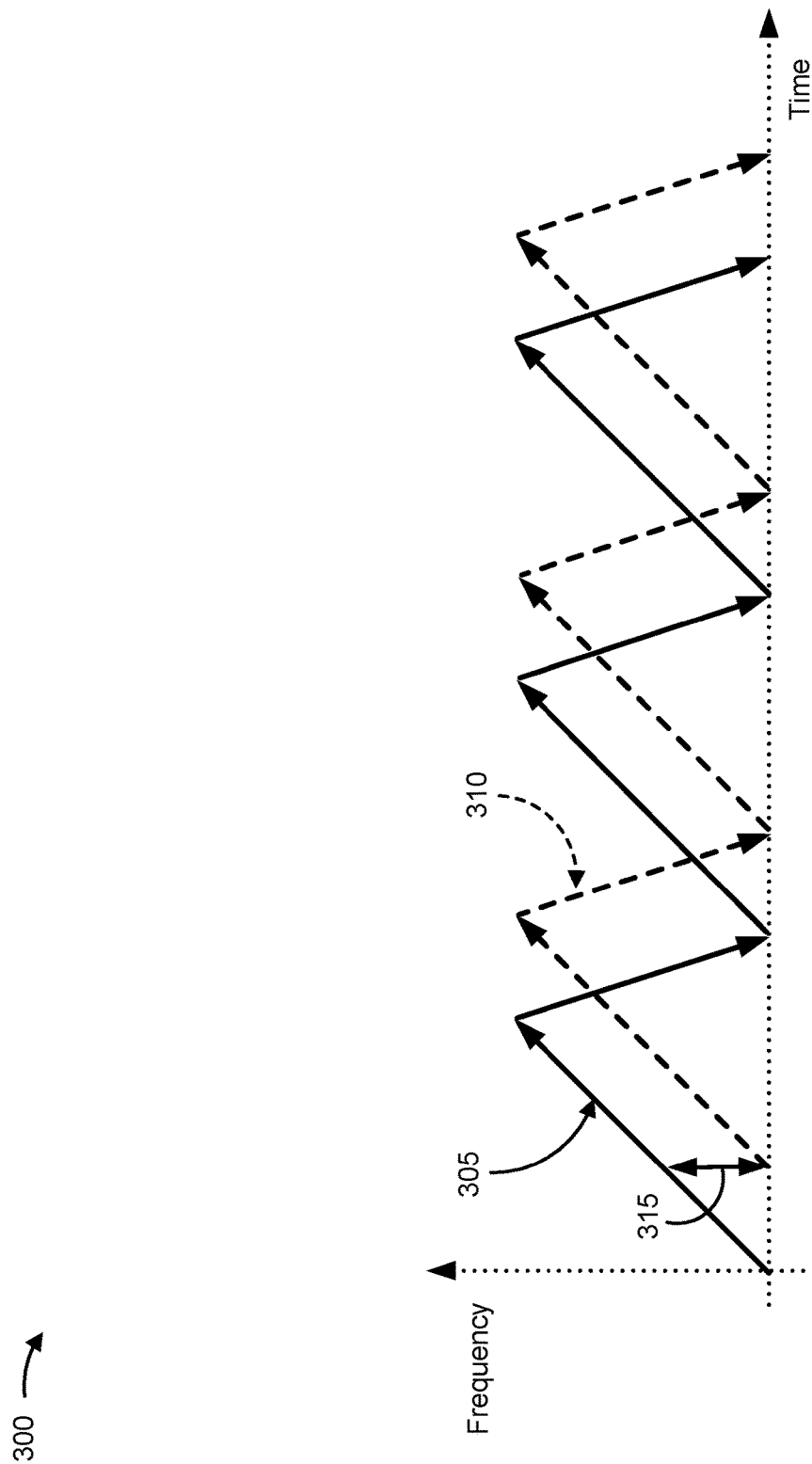
FIGS. 3 and 4 are diagrams conceptually illustrating examples associated with frequency modulated continuous wave radar detection, in accordance with various aspects of the present disclosure.

FIG. 3 is a diagram conceptually illustrating an example 300 associated with frequency modulated continuous wave (FMCW) radar detection, in accordance with various aspects of the present disclosure. Example 300 illustrates repetitions of an FMCW chirp 305 (as shown by the solid arrows above the time axis) in terms of frequency over time and of a received signal 310 (as shown by the dashed arrows above the time axis).

In some aspects, for example, a single instance of the FMCW chirp 305 may be represented by a pair of arrows—a rising arrow representing an increase from a first frequency value to a second frequency value, and an immediately subsequent falling arrow, indicating a decrease from the second frequency value to the first frequency value. Similarly, a single instance of the received signal 310 may be represented by a pair of arrows—a rising arrow representing an increase from a first frequency value to a second frequency value and an immediately subsequent falling arrow, indicating a decrease from the second frequency value to the first frequency value.

In some aspects, the FMCW chirp 305 may be generated using a waveform component (e.g., the waveform component 810 shown in FIG. 8 and discussed below in connection therewith, and/or the like) and transmitted using a transmission component (e.g., the transmission component 804 shown in FIG. 8 and discussed below in connection therewith, and/or the like). In some aspects, the received signal 310 may be received by a reception component (e.g., the reception component 802 shown in FIG. 8 and discussed below in connection therewith, and/or the like). In some aspects, the received signal 310 may be used to detect a target.

FMCW radar uses a linear frequency modulated signal to determine range. The received signal is mixed with the transmitted signal to obtain the beat frequency 315 between the two. The beat frequency may be a difference between an instantaneous frequency of the FMCW chirp 305 and a corresponding instantaneous frequency of the received signal 310. The beat frequency may be a function of the round-trip time to the reflecting target, and therefore can be mapped directly to its range. Beamforming associated with multiple receiver channels may be used to determine direction of arrival (DoA) of a received signal, which may correlate to a target's azimuthal location. Multiple radar signal chirps may be transmitted in a train of equally spaced pulses in time. Radial motion occurring between pulses within a range of resolution cell induces a shift over the pulses, which may be used to compute the Doppler radial velocity in that cell. Received radar data may be expressed as a three-dimensional (3D) tensor, with the first two dimensions (range and DoA) being in polar space, and the third dimension (Doppler radial velocity) containing velocity information.

As indicated above, FIG. 3 is provided as one or more examples. Other examples may differ from what is described with regard to FIG. 3.

Figure 4:
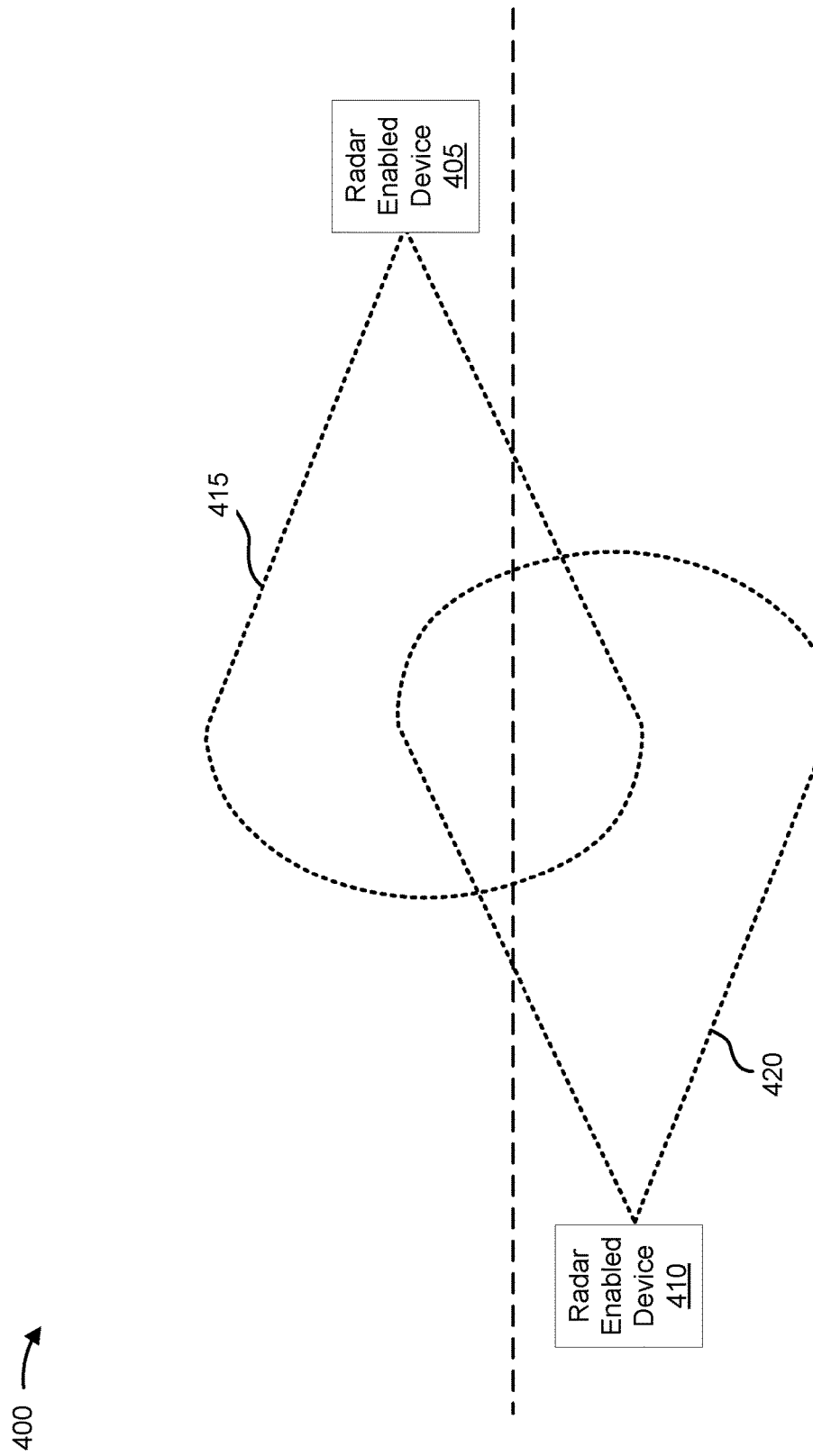

FIG. 4 illustrates an example associated with FMCW radar detection, in accordance with various aspects of the present disclosure. As shown, a radar enabled device 405 and a radar enabled device 410 may transmit signals 415 and 420, respectively.

The radar enabled device 405 and/or the radar enabled device 410 may be, be similar to, include, or be included in a base station (such as the base station 110 shown in, and described in connection with, FIGS. 1 and/or 2), a UE (such as the UE 120 shown in, and described in connection with, FIGS. 1 and/or 2), and/or the like. In some aspects, the radar enabled devices 405 and/or 410 (and/or UEs associated therewith) may be implemented in one or more vehicles. The one or more vehicles may include any vehicle that includes a radar enabled device as described herein. For example, a vehicle may be a consumer vehicle (e.g., a family car, a personal car, a recreational vehicle), an industrial vehicle, a commercial vehicle, and/or the like. A vehicle may be capable of traveling and/or providing transportation via public roadways, may be capable of use in operations associated with a worksite (e.g., a construction site), and/or the like. A vehicle may be controlled autonomously and/or semi-autonomously. Additionally, or alternatively, a vehicle may be controlled by an operator.

In some cases, the radar enabled device 405 may transmit the signal 415 in a full duplex mode (e.g., data or radar signals may be transmitted and received simultaneously at the radar enabled device 405 or the radar enabled device 410). As an illustrative example, the signals 415 and 420 may be examples of FMCW radar signals. In many instances, particularly when other nearby FMCW radar enabled devices are being used, distinguishing between interference and real targets may be difficult. In some cases, this difficulty is due to the fact that a beat frequency, calculated based at least in part on a difference between instantaneous frequencies of the transmitted FMCW signal and a received interference signal, may be indistinguishable from a beat frequency associated with a reflective target. This may be particularly true where the interference signal is a transmitted FMCW chirp from another, nearby, radar enabled device. For instance, the radar enabled device 405 may be moving towards the radar enabled device 410. The radar enabled device 410 may be transmitting the signal 420 (e.g., a FMCW radar signal) at a same time or on same resources that the 405 is transmitting the signal 415. As a result, a radar enabled device may trigger unnecessary actions based on false detection of a target, fail to trigger actions that should be triggered in the presence of a target based on a failure to detect a target due to the presence of interference, transmit additional radar chirps in an attempt to distinguish a target, thereby increasing processing and communication resource consumption, and/or the like.

As indicated above, FIG. 4 is provided as an example. Other examples may differ from what is described with regard to FIG. 4.

Some implementations utilize an LBT procedure to determine whether radio frequency resources are occupied or unoccupied, which may enable the wireless device to avoid interference (e.g., a radar enabled device may refrain from transmitting or proceed to transmit a radar signal based on a result of one or more LBT procedures indicating whether a set of resources are clear for transmission). In such LBT procedures, the radar enabled device may perform such LBT procedures based on a generated waveform for a particular signal (e.g., a radar signal), which may result in more accurate interference measurements for signaling over a set of resources. For example, the radar enabled device may identify a set of transmission parameters (e.g., transmission parameters for a chirp of an FMCW radar signal) and generate a waveform for a signal in accordance with the parameters. The radar enabled device may mix the generated waveform with a received signal (e.g., a received energy or detected signal from performing channel sensing over a set of resources) to determine whether a transmission of the signal with the generated waveform would cause or be subject to interference with another signal from another radar enabled device.

In some examples, the LBT procedure may be successful (e.g., an interference measurement may satisfy a threshold) and the radar enabled device may transmit the signal using the set of transmission parameters. In some other examples, the LBT procedure may fail. In some examples, the radar enabled device may perform another LBT procedure with a different set of transmission parameters. Additionally or alternatively, the radar enabled device may select a set of transmission parameters that results in the least interference for transmission (e.g., in the event of LBT failure when a plurality of sets of transmission parameters fail to satisfy a threshold). However, transmitting an FMCW with different transmission parameters may still result in transmission at the same time as interfering transmissions. Moreover, simply repeating the LBT procedure upon an LBT failure may result in performing an unnecessary number of LBT procedures, which may lead to increased processing and communication resource consumption, and/or the like.

In some examples, a radar enabled device may perform a frame based LBT procedure, in which the timing of repetitions of an LBT procedure is based on time frames that are configured according to a synchronized clock. In this way, a radar enabled device may repeat LBT procedures according to a schedule that facilitates moving beat frequencies associated with interference out of band so that the interference can be filtered out. As a result, aspects of the frame based LBT procedure may facilitate strategic timing of LBT procedures so as to reduce the number of LBT procedures performed while preserving the benefits of performing LBT procedures.

Figure 5:
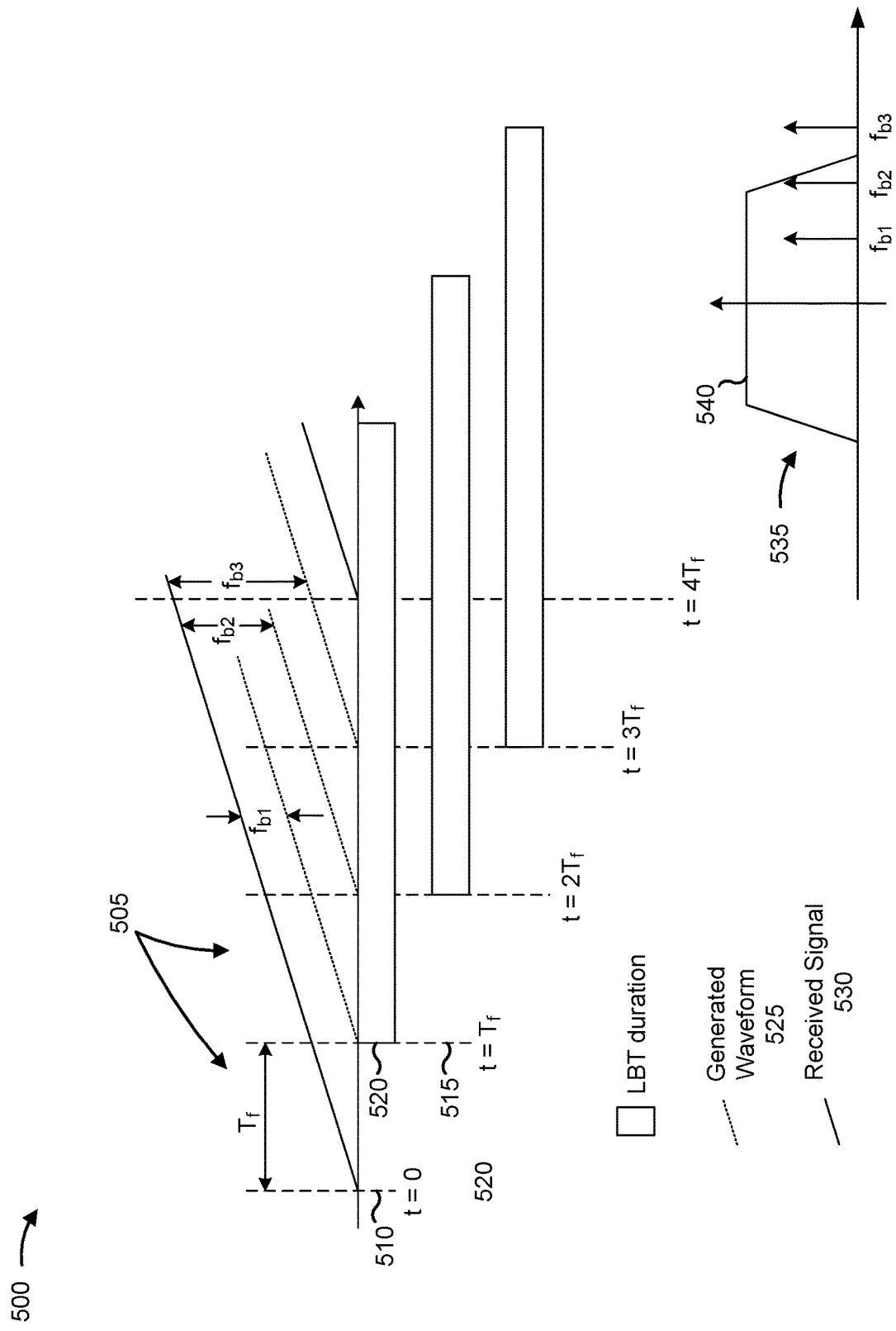
FIG. 5 illustrates an example of frame based listen before talk (LBT) for a devices, in accordance with various aspects of the present disclosure.

FIG. 5 illustrates an example 500 of frame based LBT for radar enabled devices, in accordance with various aspects of the present disclosure. Aspects of the LBT techniques described in connection with FIG. 5 may be performed by a radar enabled device such as, for example, the radar enabled device 405 shown in FIG. 4, the radar enabled device 410 shown in FIG. 4, and/or the like.

In some aspects of the techniques described herein, the radar enabled device and other radar enabled devices associated with a network may include a common notion of time. For example, radar enabled devices that wirelessly communicate with a wireless network may include a synchronized clock and may be configured to synchronize the clock based at least in part on a geo-positioning system, a sidelink communication link, and/or the like. In some aspects, for example, one or more radar enabled devices may synchronize clocks with one another via a sidelink communication link. In some aspects, a global time may be maintained by a geo-positioning system server or other entity and a radar enabled device may synchronize the synchronized clock based at least in part on communications with the geo-positioning system server or other entity.

As shown by reference number 505, aspects of the frame based LBT procedure described herein may be based at least in part on a plurality of LBT frames. Each LBT frame 505 may be defined by a pair of adjacent frame boundaries 510, 515 and may include a frame length, $T_f$, between the frame boundaries 510 and 515. In some aspects, the LBT frames 505 may be equally spaced—each of the plurality of LBT frames may have an equal frame length $T_f$. In this way, a first radar enabled device within a specified distance of a second radar enabled device (e.g., within a maximum detectable range associated with one or more of the radar enabled devices, and/or the like) may, based on the synchronized clock, determine that a particular LBT frame boundary 510 or 515 occurs at the same time instance at which the second radar enabled device determines the LBT frame boundary 510 or 515 to occur. For example, LBT frame boundaries may be defined to occur at t=0, $T_f$, $2T_f$, $3T_f$, with reference to some established t=0.

In some aspects, LBT frames may be defined such that a chirp length, $T_c$, of a radar chirp (e.g., an FMCW chirp) may be an integer multiple of the frame length. For example, in some aspects, the chirp length $T_c = mT_f$, where m an integer. In some aspects, a radar frame may begin at an LBT frame boundary 510, 515. A radar frame is a time frame in which a train of radar chirps is transmitted (or is configured to be transmitted). In this way, a first chirp of a train of chirps may begin at an LBT frame boundary 510, 515. In some aspects, the frame length $T_f$ may be larger than a propagation delay associated with a maximum detectable range associated with the radar enabled device. In some aspects, the propagation delay associated with the maximum detectable range may be less than the chirp length K.

As shown by reference number 520, the radar enabled device may perform an initial LBT procedure at an initial LBT frame boundary 515, $t=T_f$. The initial LBT procedure may be performed during an initial LBT period that begins at the initial LBT frame boundary 515. The initial LBT period has an LBT duration, $T_{LBT}$, that is greater than a chirp length K. Additional LBT procedures may be performed during additional LBT periods that begin at subsequent LBT frame boundaries. In this way, when an LBT procedure is configured to be performed, the LBT procedure is performed during a period, $[nT_f, nT_f+T_{LBT}]$, where n is an integer value. In some aspects, the LBT duration $T_{LBT}$ may have a length equal to the length of a radar frame (e.g., an FMCW frame).

In some aspects, an LBT procedure (e.g., the initial LBT procedure, an additional LBT procedure, and/or the like) may be performed based at least in part on a set of transmission parameters for a radar signal that the radar enabled device intends to transmit. In some aspects, the transmission parameters may be an example of chirp parameters for a cycle of an FMCW radar signal. In some aspects, the transmission parameters may include a carrier frequency, a bandwidth sweep range (e.g., the waveform may be transmitted across a 1 GHz range, a 1.5 GHz range, and/or the like), a sweeping time (e.g., the radar enabled device may complete a bandwidth sweep of the waveform in 2 microseconds, 6 microseconds, 12 microseconds, and/or the like), a direction of a sweep (e.g., a chirp of the waveform may be directed from a 77 degree angle from the radar enabled device to a 78 degree angle from the radar enabled device, or from the 78 degree angle to the 77 degree angle, although any parameter indicating a direction of the sweep may be used), and/or the like. The radar enabled device may utilize the set of transmission parameters to determine (e.g., generate) a waveform for the signal (e.g., the signal 415 shown in FIG. 4). For example, the radar enabled device may generate an analog transmit waveform but may refrain from transmitting a signal for a time period (e.g., zero power may be implemented with the transmit waveform until completion of an LBT period).

The radar enabled device may perform the LBT procedure using the generated waveform 525. For example, the radar enabled device may perform channel sensing on a set of resources (e.g., resources that the radar enabled device intends to utilize to transmit the generated waveform), in order to determine if the resources are occupied by another signal (e.g., the signal 420 transmitted by the radar enabled device 410 shown in FIG. 4). The radar enabled device may adjust a received signal 530 (e.g., a received signal from a channel sensing procedure) based on the generated waveform 525. Adjusting the received signal 530 may include mixing the generated waveform 525 with a received energy associated with the received signal 530.

In some aspects, adjusting the received signal 530 may include processing an output (e.g., a mixer output) of the mixture of the waveform 525 and the received signal 530. Such processing may include filtering and performing a spectral analysis. The spectral analysis may include performing a fast-Fourier transform (FFT) of the output, which may yield a measurement (e.g., a value such as a peak of a spectrum of the mixture of the waveform 525 and the received signal 530). In some aspects, the spectral analysis may be used to determine a beat frequency corresponding to the LBT procedure. The beat frequency may be associated with the generated waveform 525 and the received signal 530.

In some aspects, as shown by reference number 535, different beat frequencies (associated with different LBT procedures) may be represented as corresponding spikes on a range spectrum. In some aspects, the beat frequencies corresponding to certain LBT procedures (e.g., the beat frequency $f_{b3}$ corresponding to a third LBT procedure performed at $t=3T_f$) become out of band and are, therefore, filtered out based at least in part on a filter 540. In some aspects, filtered out beat frequencies may not be detected by the radar enabled device, in which case the radar enabled device may determine a successful result of an LBT procedure (e.g., determine that a channel is clear) based at least in part on determining that no beat frequencies are detected in association with the LBT procedure.

The radar enabled device may transmit a radar chirp corresponding to the parameters associated with the generated waveform 525 based at least in part on determining a successful result. In some aspects, the radar chirp may be transmitted following the LBT period corresponding to the successful LBT procedure. In some aspects, the radar enabled device may determine a successful result by detecting a plurality of beat frequencies corresponding to the plurality of LBT frames and determining a successful LBT frame of the plurality of LBT frames. In some aspects, an amount of interference energy detected in association with the successful LBT frame may be less than an amount of interference energy detected in association with at least one other LBT frame of the plurality of LBT frames. The radar enabled device may transmit the radar signal at an LBT frame boundary of the successful LBT frame.

In some aspects, an amount of interference energy detected in association with the successful LBT frame may be less than a threshold. In some aspects, the radar enabled device may compare a spectral measurement to a threshold. For example, the radar enabled device may compare a threshold value to a peak value of a spectrum obtained from processing the mixer output of the generated waveform 525 and the received energy signal 530 on the set of resources. The radar enabled device may determine whether the threshold is satisfied based on the comparison. For example, the radar enabled device may determine that the LBT procedure was successful (e.g., a result of the comparison of the LBT procedure indicates that transmitting the signal with the generated waveform 525 in accordance with the set of transmit parameters would result in a relatively low amount of interference with the signal 530).

The radar enabled device may determine an unsuccessful result of the LBT procedure based at least in part on detecting a beat frequency. In some aspects, the radar enabled device may schedule an additional LBT procedure to occur at an additional LBT frame boundary associated with an additional LBT frame that occurs after the LBT frame and LBT period corresponding to the unsuccessful result. In some aspects, the chirp length $T_c$ may not be an integer multiple of $T_f$ in which case the radar enabled device may perform additional LBT procedures (e.g., an LBT procedure for every LBT frame boundary within a corresponding radar frame) to detect a clean channel.

In some examples, the LBT procedure may be successful (e.g., an interference measurement may satisfy a threshold) and the radar enabled device may transmit the signal using the set of transmission parameters. In some other examples, the LBT procedure may fail. In some examples, the radar enabled device may perform another LBT procedure with a different set of transmission parameters. Additionally or alternatively, the radar enabled device may select a set of transmission parameters that results in the least interference for transmission (e.g., in the event of LBT failure when a plurality of sets of transmission parameters fail to satisfy a threshold). However, transmitting an FMCW with different transmission parameters may still result in transmission at the same time as interfering transmissions. Moreover, simply repeating the LBT procedure upon an LBT failure may result in performing an unnecessary number of LBT procedures, which may lead to increased processing and communication resource consumption, and/or the like.

In some cases, radar signals transmitted by different radar enabled devices may have different chirp lengths. A received signal that has a different chirp length than a generated waveform (e.g., transmitted signal) may result in a beat frequency that varies with time. Interference created by a radar enabled device transmitting a radar signal having a different chirp length than the generated waveform may appear as wideband noise. As a result, use of a frame-based LBT procedure without accounting for chirps of different lengths may not result in identifying any successful frame boundaries. This may result in an unnecessary number of LBT procedures, which may lead to increased processing and communication resource consumption, and/or the like.

Aspects of the techniques and apparatuses described herein provide a frame based LBT procedure with variable chirp lengths. For example, in aspects, a radar enabled device may perform a plurality of LBT procedures corresponding to a plurality of chirp lengths. The radar enabled device may transmit a radar signal based at least in part on a successful result of an LBT procedure of the plurality of LBT procedures. In this way, aspects may facilitate identifying a chirp length and frame boundary that are suitable for transmission. In some aspects, if all chirp lengths of a set of potential chirp lengths have been tried and fail to result in a beat frequency associated with interference out of band so that the interference can be filtered out, the radar enabled device may select the chirp length and the frame boundary that are associated with the least amount of interference energy. In this way, aspects may facilitate reducing the processing resources and power consumption used in determining occupation of radio resources to facilitate effective FMCW radar detection in environments in which interfering devices use different chirp lengths. As a result, aspects may lead to decreased processing and communication resource consumption, and/or the like.

As indicated above, FIG. 5 is provided as an example. Other examples may differ from what is described with regard to FIG. 5.

Figure 6:
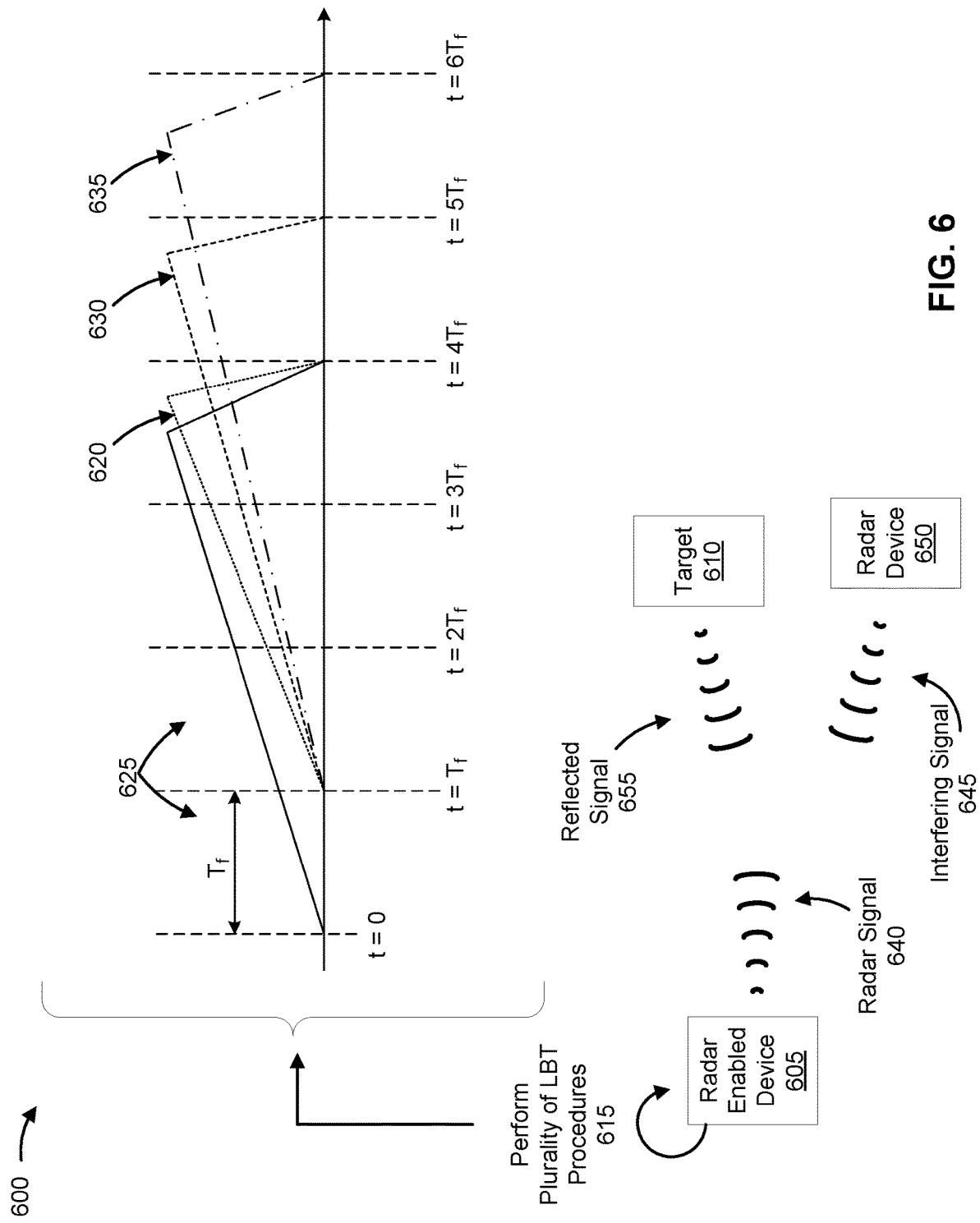
FIG. 6 is a diagram illustrating an example associated with frame based LBT for radar enabled devices with variable chirp lengths, in accordance with various aspects of the present disclosure.

FIG. 6 illustrates an example 600 of frame based LBT for radar with variable chirp lengths, in accordance with various aspects of the present disclosure. As shown, a radar enabled device 605 (e.g., similar to the radar enabled device 405 shown in FIG. 4, the radar enabled device 410 shown in FIG. 4, and/or the like) may be configured to detect a target 610.

The radar enabled device 605 may include one or more devices capable of generating, transmitting, receiving, storing, processing, and/or providing information associated with transmitted FMCW radar signals, received signals, and/or the like. For example, the radar enabled device 605 may be associated with a wireless communication device, a UE, a vehicle, and/or the like. In some aspects, for example, the radar enabled device 605 may be implemented as a sensor in a vehicle, mounted independently of a vehicle, and/or the like. The target 610 may be any object capable of reflecting at least a portion of a radar signal.

As shown by reference number 615, the radar enabled device 605 may perform a plurality of LBT procedures corresponding to a plurality of chirp lengths. The LBT procedures may include frame based LBT procedures such as the frame based LBT procedure described above in connection with FIG. 5. The radar enabled device 605 may select the plurality of chirp lengths from a set of potential chirp lengths. The set of potential chirp lengths may include a set of known chirp lengths capable of being transmitted by radar enabled devices, a set of predicted chirp lengths associated with future radar enabled devices, and/or the like.

In aspects, the radar enabled device 605 may perform a first LBT procedure of the plurality of LBT procedures. The first LBT procedure may correspond to a first chirp length of the plurality of chirp lengths. For example, the first LBT procedure may be performed using a first generated waveform 620 having the first chirp length. As shown, for example, the first chirp length may span three LBT frames 625 (e.g., between $t=T_f$ and $t=4T_f$). Based at least in part on determining an unsuccessful result of the first LBT procedure, the radar enabled device 605 may perform a second LBT procedure. The second LBT procedure may correspond to a second chirp length of the plurality of chirp lengths. For example, the second LBT procedure may be performed using a second generated waveform 630 having the second chirp length. As shown, for example, the second chirp length may span four LBT frames 625 (e.g., between $t=T_f$ and $t=5T_f$).

Similarly, based at least in part on determining an unsuccessful result of the second LBT procedure, the radar enabled device 605 may perform a third LBT procedure. The third LBT procedure may correspond to a third chirp length of the plurality of chirp lengths. For example, the third LBT procedure may be performed using a third generated waveform 635 having the third chirp length. As shown, for example, the third chirp length may span five LBT frames 625 (e.g., between $t=T_f$ and $t=6T_f$). In some aspects, the chirp lengths may be any other chirp length and/or may be measured in terms of LBT frame span (as illustrated in FIG. 6), in terms of microseconds, in terms of seconds, and/or the like. The plurality of LBT procedures may include any number of LBT procedures. The radar enabled device 605 may perform the LBT procedures based at least in part on a set of transmission parameters for the radar signal.

Although the generated waveforms 620, 630, and 635 are shown as starting at the same LBT frame boundary, in some aspects, the radar enabled device 605 may perform LBT procedures at any number of LBT frame boundaries. For example, in some aspects, the radar enabled device 605 may perform, at a first LBT frame boundary associated with a first LBT frame of a plurality of LBT frames, a first LBT procedure. Based at least in part on determining an unsuccessful result of the first LBT procedure, the radar enabled device 605 may perform, at a second LBT frame boundary associated with a second LBT frame of a plurality of LBT frames, a second LBT procedure. The first LBT procedure may correspond to a first chirp length of the plurality of chirp lengths, and the second LBT procedure may correspond to a second chirp length of the plurality of chirp lengths. The first chirp length may be equal to, or different than, the second chirp length.

As shown by reference number 640, the radar enabled device 605 may transmit a radar signal. The radar signal may include, for example, an FMCW radar signal. In some aspects, the radar enabled device 605 may transmit the radar signal based at least in part on a successful result of an LBT procedure of the plurality of LBT procedures. In some aspects, as shown by reference number 645, the radar enabled device 605 may receive an interfering signal from a radar enabled device 650. The successful LBT procedure may facilitate filtering the interfering signal out so that the radar enabled device 605 is able to detect a reflected signal 655 that is a reflection, off of the target 610, of a portion of the radar signal transmitted by the radar enabled device 605.

In some aspects, the radar enabled device 605 may determine the successful result by determining that a beat frequency has not been detected in association with the LBT procedure. The LBT procedure may correspond to a successful chirp length of the plurality of chirp lengths. A successful chirp length may be a chirp length that corresponds to a successful LBT procedure. In some aspects, the radar enabled device 605 may transmit the radar signal using the successful chirp length.

In some aspects, the radar enabled device 605 may determine the successful result of the LBT by determining a chirp length and frame boundary that correspond to a least amount of interference energy or an amount of interference energy that satisfies an interference threshold. For example, the radar enabled device 605 may determine an unsuccessful result associated with each of the plurality of chirp lengths. The radar enabled device 605 may detect a plurality of beat frequencies corresponding to a plurality of LBT frames and may determine a successful combination. The successful combination may include a chirp length of the plurality of chirp lengths and an LBT frame of a plurality of LBT frames. An amount of interference energy detected in association with the successful combination may be less than an amount of interference energy detected in association with at least one other combination of chirp length and LBT frame. In some aspects, as indicated above, the amount of interference energy detected in association with the successful combination may be less than an amount of interference energy detected in association with any other combination of chirp length and LBT frame. The radar enabled device 605 may transmit the radar signal using the successful combination of chirp length and LBT frame.

In some aspects, the radar enabled device 605 may perform an action based at least in part on detecting the target 610. For example, in some aspects, the radar enabled device 605 may output an indication of the detection of the radar target 610. The output of the indication of the detection may be provided to a computing device, a sensor controller of a vehicle, a mobile device, an output device, and/or the like. In some aspects, the radar enabled device 605 may output an instruction to a vehicle motion controller to take evasive action with respect to the target 610. According to various aspects of the disclosure, the radar enabled device 605 may be configured to perform any number of different types of actions based at least in part on detecting the target 610.

As indicated above, FIG. 6 is provided as an example. Other examples may differ from what is described with regard to FIG. 6.

Figure 7:
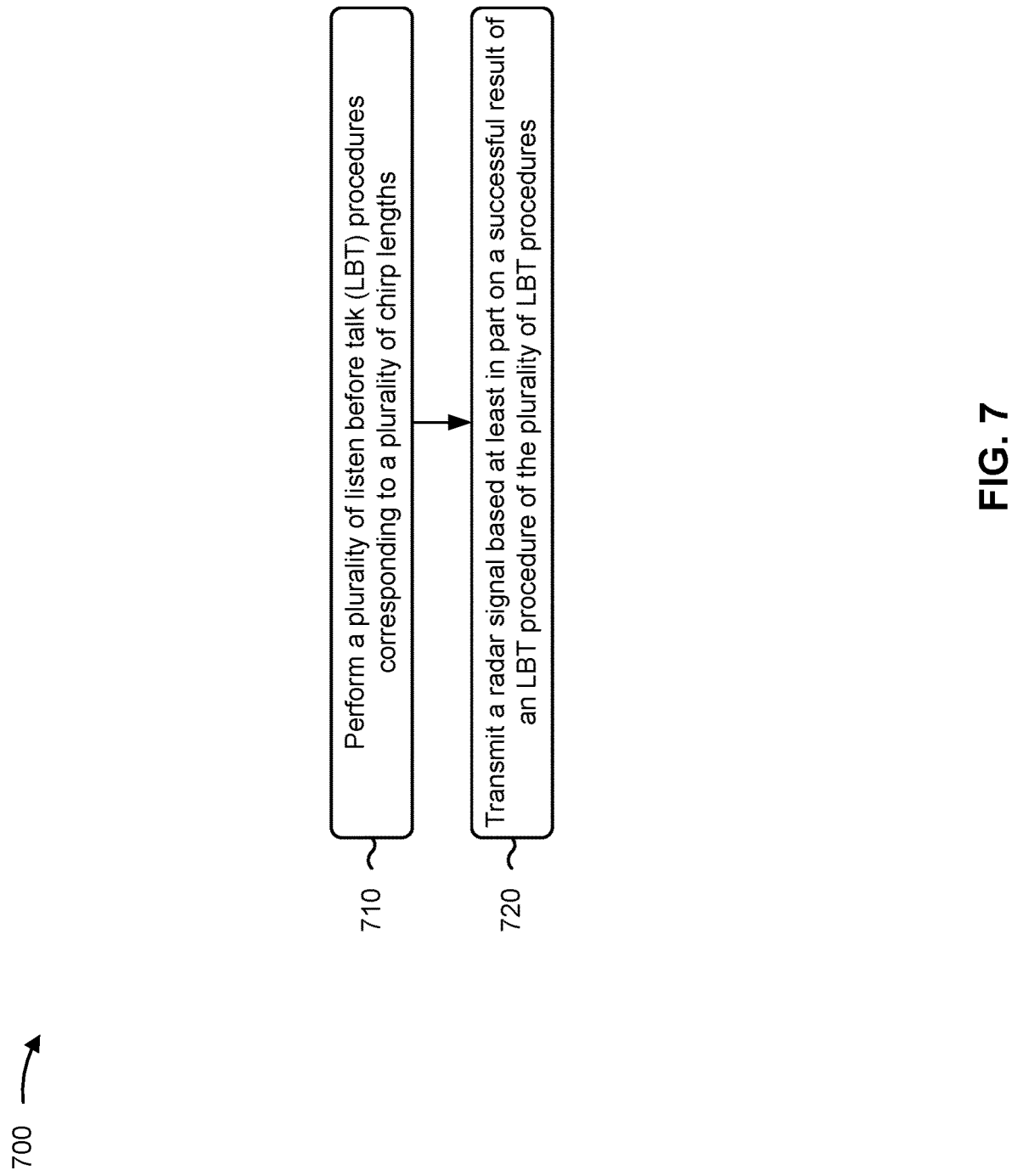
FIG. 7 is a diagram illustrating an example process associated with frame based LBT for radar enabled devices with variable chirp lengths, in accordance with various aspects of the present disclosure.

FIG. 7 is a diagram illustrating an example process 700 performed, for example, by a radar enabled device, in accordance with various aspects of the present disclosure. Example process 700 is an example where the radar enabled device (e.g., radar enabled device 405 and/or 410 shown in FIG. 4) performs operations associated with frame based LBT for radar with variable chirp lengths.

As shown in FIG. 7, in some aspects, process 700 may include performing a plurality of LBT procedures corresponding to a plurality of chirp lengths (block 710). For example, the radar enabled device (e.g., using LBT component 812, depicted in FIG. 8) may perform a plurality of LBT procedures corresponding to a plurality of chirp lengths, as described above.

As further shown in FIG. 7, in some aspects, process 700 may include transmitting a radar signal based at least in part on a successful result of an LBT procedure of the plurality of LBT procedures (block 720). For example, the radar enabled device (e.g., using transmission component 804, depicted in FIG. 8) may transmit a radar signal based at least in part on a successful result of an LBT procedure of the plurality of LBT procedures, as described above.

Process 700 may include additional aspects, such as any single aspect or any combination of aspects described below and/or in connection with one or more other processes described elsewhere herein.

In a first aspect, process 700 includes performing a first LBT procedure of the plurality of LBT procedures, wherein the first LBT procedure corresponds to a first chirp length of the plurality of chirp lengths, determining an unsuccessful result of the first LBT procedure, and performing a second LBT procedure of the plurality of LBT procedures, wherein the second LBT procedure corresponds to a second chirp length of the plurality of chirp lengths.

In a second aspect, alone or in combination with the first aspect, process 700 includes selecting the plurality of chirp lengths from a set of potential chirp lengths.

In a third aspect, alone or in combination with one or more of the first and second aspects, process 700 includes performing, at a first LBT frame boundary associated with a first LBT frame of a plurality of LBT frames, a first LBT procedure, determining an unsuccessful result of the first LBT procedure, and performing, at a second LBT frame boundary associated with a second LBT frame of a plurality of LBT frames, a second LBT procedure.

In a fourth aspect, alone or in combination with the third aspect, the first LBT procedure corresponds to a first chirp length of the plurality of chirp lengths, and the second LBT procedure corresponds to a second chirp length of the plurality of chirp lengths.

In a fifth aspect, alone or in combination with the fourth aspect, the first chirp length is different than the second chirp length.

In a sixth aspect, alone or in combination with the fourth aspect, the first chirp length is equal to the second chirp length.

In a seventh aspect, alone or in combination with one or more of the first through sixth aspects, process 700 includes determining the successful result of the LBT procedure, wherein determining the successful result comprises determining that a beat frequency has not been detected in association with the LBT procedure, and wherein the LBT procedure corresponds to a successful chirp length of the plurality of chirp lengths.

In an eighth aspect, alone or in combination with the seventh aspect, transmitting the radar signal comprises transmitting the radar signal using the successful chirp length.

In a ninth aspect, alone or in combination with one or more of the first through eighth aspects, process 700 includes determining the successful result of the LBT, wherein determining the successful result comprises determining an unsuccessful result associated with each of the plurality of chirp lengths, detecting a plurality of beat frequencies corresponding to a plurality of LBT frames, and determining a successful combination, wherein the successful combination comprises a chirp length of the plurality of chirp lengths and an LBT frame of a plurality of LBT frames, and wherein an amount of interference energy detected in association with the successful combination is less than an amount of interference energy detected in association with at least one other combination of chirp length and LBT frame.

In a tenth aspect, alone or in combination with the ninth aspect, transmitting the radar signal comprises transmitting the radar signal using the successful combination.

In an eleventh aspect, alone or in combination with one or more of the first through tenth aspects, performing the LBT procedure comprises performing the LBT procedure based at least in part on a set of transmission parameters for the radar signal.

In a twelfth aspect, alone or in combination with one or more of the first through eleventh aspects, the radar signal comprises a frequency modulated continuous wave radar signal.

In a thirteenth aspect, alone or in combination with one or more of the first through twelfth aspects, the radar enabled device is associated with at least one of a wireless communication device, a user equipment, or a vehicle.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
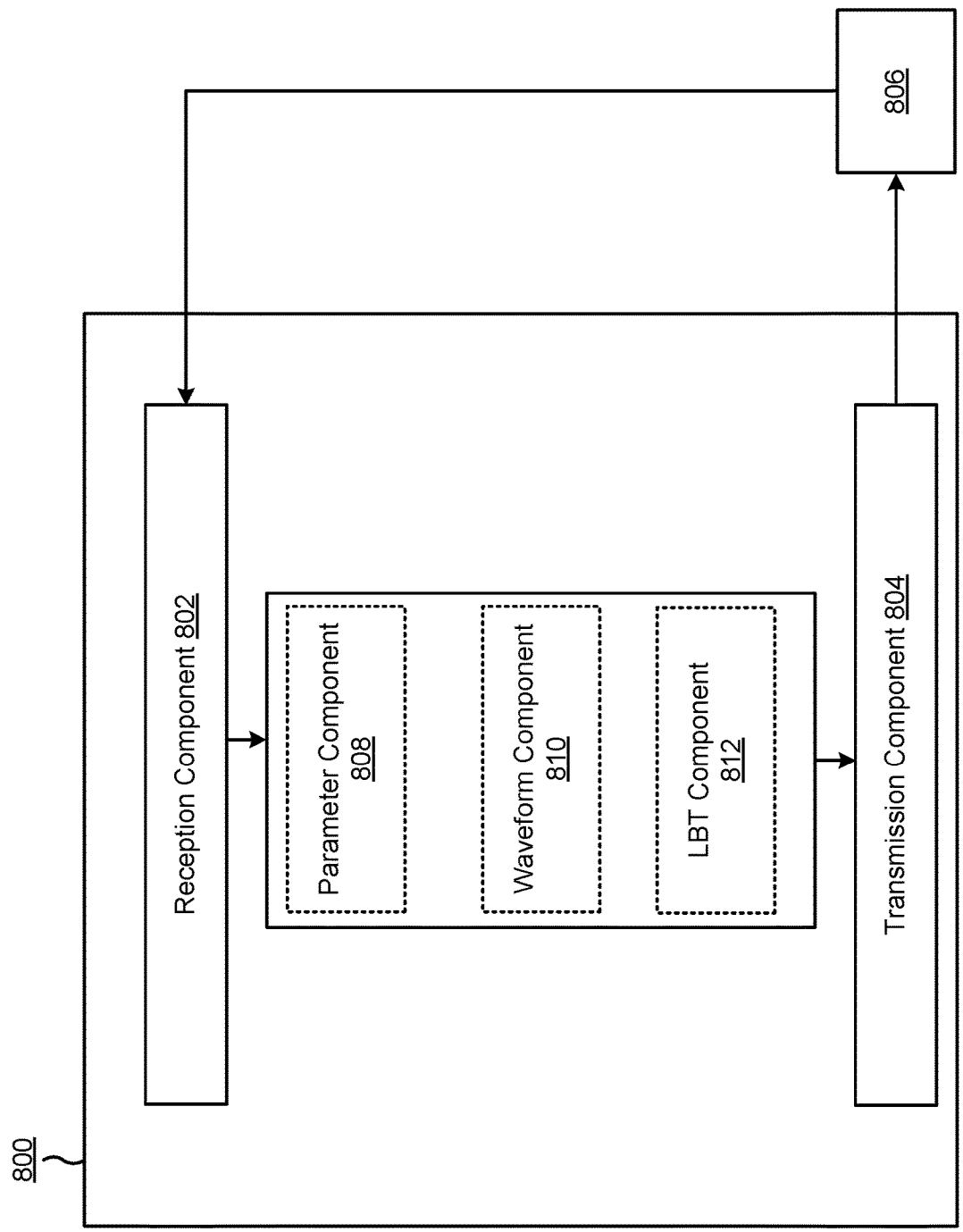
FIGS. 8 and 9 are block diagrams of example apparatuses for wireless communication and signal detection, in accordance with various aspects of the present disclosure.

FIG. 8 is a block diagram of an example apparatus 800 for wireless communication and radar detection. The apparatus 800 may be a radar enabled device (e.g., the radar enabled device 405 described in connection with FIG. 4, the radar enabled device 410 described in connection with FIG. 4, the radar enabled device described in connection with FIG. 5, the radar enabled device 605 described in connection with FIG. 6, the radar enabled device described in connection with FIG. 7, and/or the like), or a radar enabled device may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a parameter component 808, a waveform component 810, and/or an LBT component 812, among other examples.

In some aspects, the apparatus 800 may be configured to perform one or more operations described herein in connection with FIG. 6. Additionally or alternatively, the apparatus 800 may be configured to perform one or more processes described herein, such as process 700 of FIG. 7. In some aspects, the apparatus 800 and/or one or more components shown in FIG. 8 may include one or more components of the UE 120 described above in connection with FIG. 2. Additionally, or alternatively, one or more components shown in FIG. 8 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive signals, such as reference signals, control information, data communications, received signals (e.g., received signals) or a combination thereof. In some aspects, the reception component 802 may receive communications from the apparatus 806. The reception component 802 may provide received signals to one or more other components of the apparatus 800. In some aspects, the reception component 802 may perform signal processing on the received signals (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE 120 described above in connection with FIG. 2.

The transmission component 804 may transmit signals, such as reference signals, control information, data communications, radar signals (e.g., FMCW chirps, and/or the like), or a combination thereof. In some aspects, the transmission component 804 may transmit communications to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated signals (such as filtering, amplification, modulation, digital-to-analog conversion, multiplexing, interleaving, mapping, or encoding, among other examples), and may transmit the processed signals. In some aspects, the transmission component 804 may include one or more antennas, a modulator, a transmit MIMO processor, a transmit processor, a controller/processor, a memory, or a combination thereof, of the UE 120 described above in connection with FIG. 2. In some aspects, the transmission component 804 may be co-located with the reception component 802 in a transceiver.

The parameter component 808 may identify, store, manage, and/or apply a set of transmission parameters of a radar signal for transmission from the radar enabled device. The parameter component 808 may include a memory. The parameter component 808 may include one or more processors operatively coupled to the memory. In some aspects, the memory and the one or more processors may be configured to identify the set of transmission parameters. The parameter component 808 may include one or more instructions that, when executed by one or more processors of a radar enabled device, cause the radar enabled device to identify a set of transmission parameters of a signal for transmission from the radar enabled device. The parameter component 808 may include means for identifying a set of transmission parameters of a signal for transmission from the radar enabled device.

The waveform component 810 may generate a transmission waveform of the radar signal on a set of radio resources based on the set of transmission parameters. The waveform component 810 may include a memory. The waveform component 810 may include one or more processors operatively coupled to the memory. In some aspects, the memory and the one or more processors may be configured to generate the waveform. The waveform component 810 may include one or more instructions that, when executed by one or more processors of a radar enabled device, cause the radar enabled device to generate a transmission waveform of the signal on a set of radio resources based on the set of transmission parameters. The waveform component 810 may include means for generating a transmission waveform of the signal on a set of radio resources based on the set of transmission parameters.

The LBT component 812 may perform a first LBT procedure of the plurality of LBT procedures, wherein the first LBT procedure corresponds to a first chirp length of the plurality of chirp lengths. The LBT component 812 may determine an unsuccessful result of the first LBT procedure and perform a second LBT procedure of the plurality of LBT procedures, where the second LBT procedure corresponds to a second chirp length of the plurality of chirp lengths. The transmission component 804 may transmit a radar signal based at least in part on a successful result of an LBT procedure of the plurality of LBT procedures.

The LBT component 812 may include a memory. The LBT component 812 may include one or more processors operatively coupled to the memory. The memory and the one or more processors may be configured to perform an LBT procedure. The LBT component 812 may include one or more instructions that, when executed by one or more processors of a radar enabled device, cause the radar enabled device to perform one or more LBT procedures.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
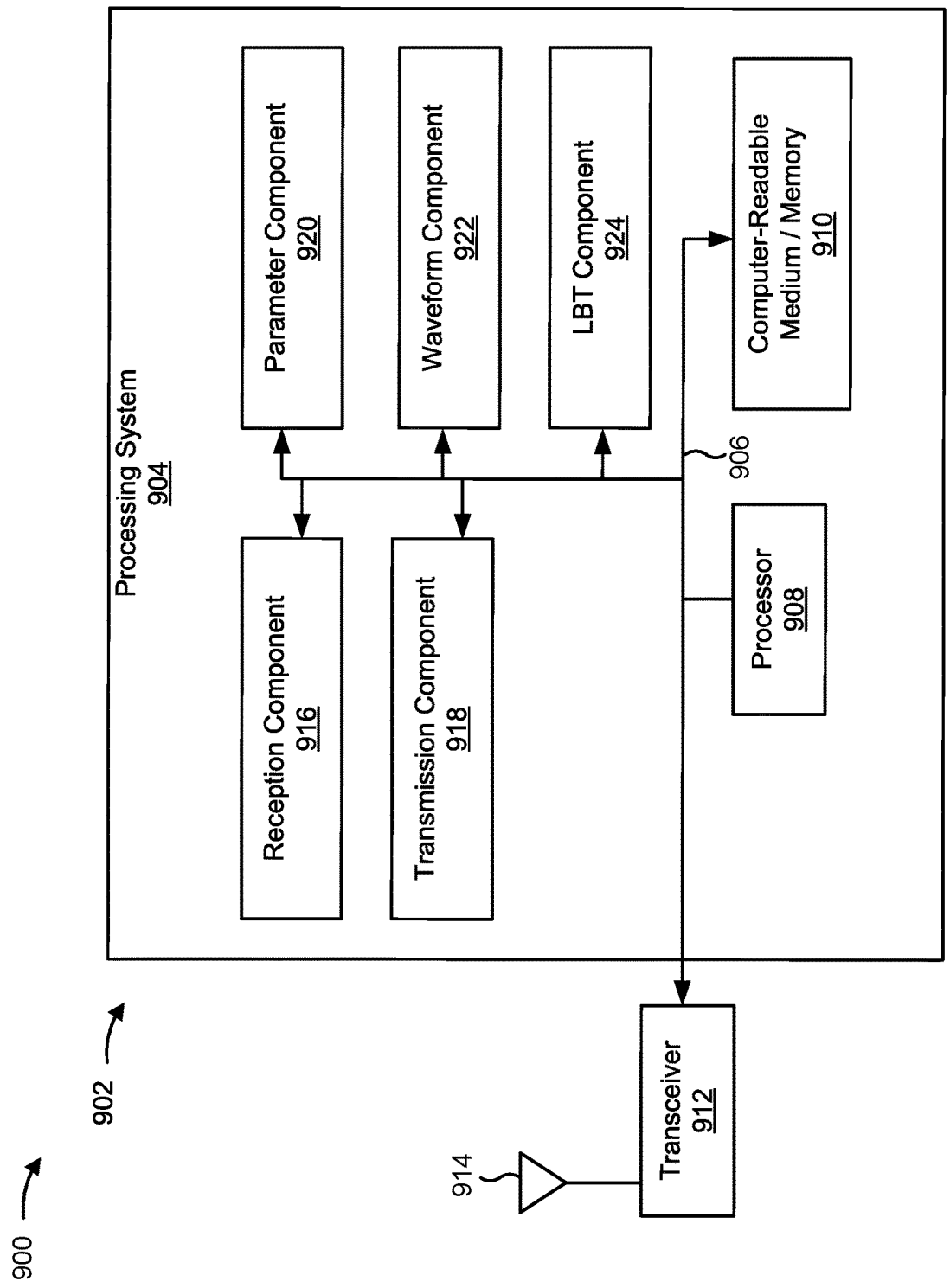

FIG. 9 is a diagram illustrating an example 900 of a hardware implementation for an apparatus 902 employing a processing system 904. The apparatus 902 may be, be similar to, include, or be included in the apparatus 800 shown in FIG. 8.

The processing system 904 may be implemented with a bus architecture, represented generally by the bus 906. The bus 906 may include any number of interconnecting buses and bridges depending on the specific application of the processing system 904 and the overall design constraints. The bus 906 links together various circuits including one or more processors and/or hardware components, represented by a processor 908, the illustrated components, and the computer-readable medium/memory 910. The bus 906 may also link various other circuits, such as timing sources, peripherals, voltage regulators, power management circuits, and/or the like.

The processing system 904 may be coupled to a transceiver 912. The transceiver 912 is coupled to one or more antennas 914. The transceiver 912 provides a means for transmitting signals (e.g., radar signals and/or communication signals) and/or communicating with various other apparatuses over a transmission medium. The transceiver 912 receives a signal from the one or more antennas 914, extracts information from the received signal, and provides the extracted information to the processing system 904, specifically a reception component 916. In addition, the transceiver 912 receives information from the processing system 904, specifically a transmission component 918, and generates a signal to be applied to the one or more antennas 914 based at least in part on the received information. The processing system may include a parameter component 920 configured to manage one or more transmission parameters for a radar signal, a waveform component 922 configured to generate a radar waveform, and/or an LBT component 924 configured to perform one or more LBT procedures, as described herein.

The processor 908 is coupled to the computer-readable medium/memory 910. The processor 908 is responsible for general processing, including the execution of software stored on the computer-readable medium/memory 910. The software, when executed by the processor 908, causes the processing system 904 to perform the various functions described herein in connection with a client. The computer-readable medium/memory 910 may also be used for storing data that is manipulated by the processor 908 when executing software. The processing system 904 may include any number of additional components not illustrated in FIG. 9. The components illustrated and/or not illustrated may be software modules running in the processor 908, resident/stored in the computer readable medium/memory 910, one or more hardware modules coupled to the processor 908, or some combination thereof.

In some aspects, the processing system 904 may be a component of the UE 120 and may include the memory 282 and/or at least one of the TX MIMO processor 266, the RX processor 258, and/or the controller/processor 280. In some aspects, the apparatus 902 for wireless communication provides means for performing a plurality of LBT procedures corresponding to a plurality of chirp lengths; and transmitting a radar signal based at least in part on a successful result of an LBT procedure of the plurality of LBT procedures. The aforementioned means may be one or more of the aforementioned components of the processing system 904 of the apparatus 902 configured to perform the functions recited by the aforementioned means. As described elsewhere herein, the processing system 904 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 9 is provided as an example. Other examples may differ from what is described in connection with FIG. 9.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method performed by a radar enabled device, comprising:
    performing a plurality of listen before talk (LBT) procedures corresponding to a plurality of chirp lengths and a plurality of LBT frames, wherein the plurality of LBT frames include time frames corresponding to the plurality of chirp lengths; and
    transmitting a radar signal, at a first LBT boundary of a first pair of LBT boundaries associated with a first LBT frame of the plurality of LBT frames, based at least in part on a successful result of a first LBT procedure of the plurality of LBT procedures, wherein the first LBT frame is associated with a first chirp length of the plurality of chirp lengths.

2. The method of claim 1, comprising:
    performing the first LBT procedure, wherein the first LBT procedure corresponds to the first chirp length;
    determining an unsuccessful result of the first LBT procedure; and
    performing a second LBT procedure of the plurality of LBT procedures, wherein the second LBT procedure corresponds to a second chirp length of the plurality of chirp lengths.

3. The method of claim 1, further comprising selecting the plurality of chirp lengths from a set of potential chirp lengths.

4. The method of claim 1, comprising:
performing, at a second LBT frame boundary of a second pair of LBT boundaries associated with a second LBT frame of the plurality of LBT frames, a second LBT procedure of the plurality of LBT procedures;
determining an unsuccessful result of the second LBT procedure; and
performing, at the first LBT frame boundary, the first LBT procedure.

5. The method of claim 4, wherein the second LBT procedure corresponds to a second chirp length of the plurality of chirp lengths.

6. The method of claim 5, wherein the first chirp length is different than the second chirp length.

7. The method of claim 5, wherein the first chirp length is equal to the second chirp length.

8. The method of claim 1, further comprising determining the successful result of the first LBT procedure based at least in part on determining that a beat frequency has not been detected in association with the first LBT procedure.

9. The method of claim 8, wherein transmitting the radar signal comprises transmitting the radar signal using the first chirp length.

10. The method of claim 1, further comprising:
determining an unsuccessful result associated with each of the plurality of chirp lengths;
detecting a plurality of beat frequencies corresponding to the plurality of LBT frames;
determining a successful combination, wherein the successful combination comprises the first chirp length and the first LBT frame, wherein an amount of interference energy detected in association with the successful combination is less than an amount of interference energy detected in association with at least one other combination of another chirp length, of the plurality of chirp lengths, and another LBT frame of the plurality of LBT frames; and
determining the successful result of the first LBT procedure based at least in part on determining the successful combination.

11. The method of claim 10, wherein transmitting the radar signal comprises transmitting the radar signal using the successful combination.

12. The method of claim 1, wherein performing the LBT procedure comprises performing the first LBT procedure based at least in part on a set of transmission parameters for the radar signal.

13. The method of claim 1, wherein the radar signal comprises a frequency modulated continuous wave radar signal.

14. The method of claim 1, wherein the radar enabled device is associated with at least one of:
a wireless communication device,
a user equipment, or
a vehicle.

15. A radar enabled device, comprising:
a memory; and
one or more processors coupled to the memory, the one or more processors configured to:
perform a plurality of listen before talk (LBT) procedures corresponding to a plurality of chirp lengths and a plurality of LBT frames, wherein the plurality of LBT frames include time frames corresponding to the plurality of chirp lengths; and
transmit a radar signal, at a first LBT boundary of a first pair of LBT boundaries associated with a first LBT frame of the plurality of LBT frames, based at least in part on a successful result of a first LBT procedure of the plurality of LBT procedures, wherein the first LBT frame is associated with a first chirp length of the plurality of chirp lengths.

16. The radar enabled device of claim 15, wherein the one or more processors are further configured to:
perform the first LBT procedure, wherein the first LBT procedure corresponds to the first chirp length;
determine an unsuccessful result of the first LBT procedure; and
perform a second LBT procedure of the plurality of LBT procedures, wherein the second LBT procedure corresponds to a second chirp length of the plurality of chirp lengths.

17. The radar enabled device of claim 15, wherein the one or more processors are further configured to select the plurality of chirp lengths from a set of potential chirp lengths.

18. The radar enabled device of claim 15, wherein the one or more processors are further configured to:
perform, at a second LBT frame boundary of a second pair of LBT boundaries associated with a second LBT frame of the plurality of LBT frames, a second LBT procedure of the plurality of LBT procedures;
determine an unsuccessful result of the second LBT procedure; and
perform, at the first LBT frame boundary, the first LBT procedure.

19. The radar enabled device of claim 18, wherein the second LBT procedure corresponds to a second chirp length of the plurality of chirp lengths.

20. The radar enabled device of claim 19, wherein the first chirp length is different than the second chirp length.

21. The radar enabled device of claim 19, wherein the first chirp length is equal to the second chirp length.

22. The radar enabled device of claim 15, wherein the one or more processors are further configured to determine the successful result of the first LBT procedure based at least in part on determining that a beat frequency has not been detected in association with the first LBT procedure.

23. The radar enabled device of claim 22, wherein the memory and the one or more processors, to transmit the radar signal, are configured to transmit the radar signal using the first chirp length.

24. The radar enabled device of claim 15, wherein the one or more processors are further configured to:
determine an unsuccessful result associated with each of the plurality of chirp lengths;
detect a plurality of beat frequencies corresponding to the plurality of LBT frames;
determine a successful combination, wherein the successful combination comprises the first chirp length and the first LBT frame, wherein an amount of interference energy detected in association with the successful combination is less than an amount of interference energy detected in association with at least one other combination of another chirp length, of the plurality of chirp lengths, and another LBT frame of the plurality of LBT frames; and
determine the successful result of the first LBT procedure based at least in part on determining the successful combination.

25. The radar enabled device of claim 24, wherein the one or more processors, to transmit the radar signal, are configured to transmit the radar signal using the successful combination.

26. The radar enabled device of claim 15, wherein the one or more processors, to perform the first LBT procedure, are configured to perform the first LBT procedure based at least in part on a set of transmission parameters for the radar signal.

27. The radar enabled device of claim 15, wherein the radar signal comprises a frequency modulated continuous wave radar signal.

28. The radar enabled device of claim 15, wherein the radar enabled device is associated with at least one of:
- a wireless communication device,
- a user equipment, or
- a vehicle.

29. A non-transitory computer-readable medium storing a set of instructions comprising:
- one or more instructions that, when executed by one or more processors of a radar enabled device, cause the radar enabled device to:
  - perform a plurality of listen before talk (LBT) procedures corresponding to a plurality of chirp lengths and a plurality of LBT frames, wherein the plurality of LBT frames include time frames corresponding to the plurality of chirp lengths; and
  - transmit a radar signal, at a first LBT boundary of a first pair of LBT boundaries associated with a first LBT frame of the plurality of LBT frames, based at least in part on a successful result of a first LBT procedure of the plurality of LBT procedures, wherein the first LBT frame is associated with a first chirp length of the plurality of chirp lengths.

30. An apparatus for a radar enabled device, comprising:
- means for performing a plurality of listen before talk (LBT) procedures corresponding to a plurality of chirp lengths and a plurality of LBT frames, wherein the plurality of LBT frames includes time frames corresponding to the plurality of chirp lengths; and
- means for transmitting a radar signal, at a first LBT boundary of a first pair of LBT boundaries associated with a first LBT frame of the plurality of LBT frames, based at least in part on a successful result of a first LBT procedure of the plurality of LBT procedures, wherein the first LBT frame is associated with a first chirp length of the plurality of chirp lengths.

* * * * *